United States Patent Office 3,109,834
Patented Nov. 5, 1963

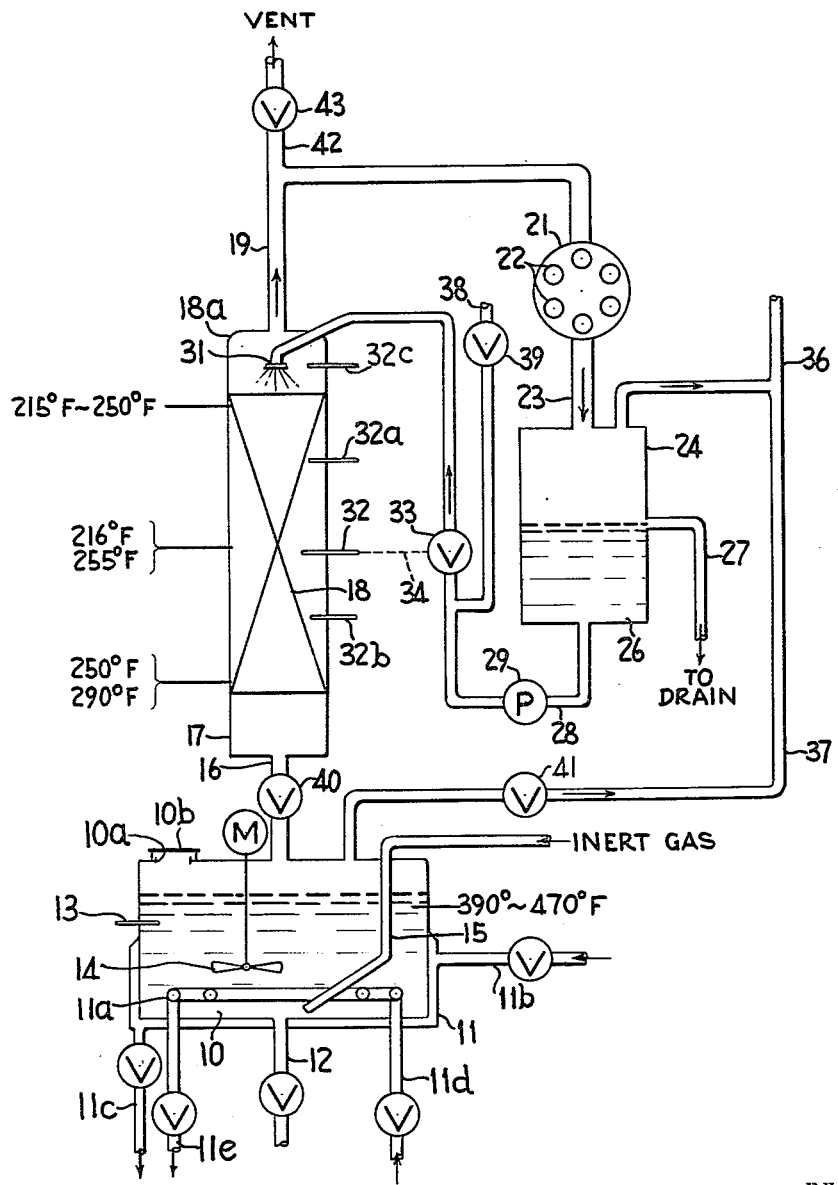

---

3,109,834
FUSION PROCESS FOR THE PRODUCTION OF POLYMERIC POLYESTERS FROM ISOPHTHALIC ACID AND POLYOLS
Jerome A. Seiner, Pittsburgh, Pa., assignor to Pittsburgh Plate Glass Company, Pittsburgh, Pa., a corporation of Pennsylvania
Filed Dec. 29, 1961, Ser. No. 168,296
4 Claims. (Cl. 260—75)

This invention relates to a method of preparing by single stage fusion cook or bulk polymerization, polyesters from a mixture of a dihydric alcohol and a dicarboxylic acid component, at least a part of which is free isophthalic acid.

It has heretofore been disclosed to prepare polyesters of mixtures of dihydric alcohols, such as glycols, and mixtures of carbonyl compounds, such as dicarboxylic acids and anhydrides of dicarboxylic acids, such as maleic anhydride, phthalic anhydride and the like. The reaction is characterized by the evolution of water and tends to be reversible. Therefore, in order to obtain esterification as quickly as possible, it has been disclosed to add to the reaction mixture a suitable azetropic solvent, represented by toluene or xylene. When the mixture is heated to esterification temperature, this azeotropic agent is evaporated and the vapors thereof sweep out the water vapor, leaving the system relatively anhydrous. The resultant mixture of vapors is taken out of the system and condensed to form an aqueous phase and a solvent phase, the latter being returned to the reaction mixture and thus saved. Unhappily, this system is wasteful of dihydric alcohol component, inasmuch as a considerable amount of it is carried away from the reaction mixture by the water vapors and the vapors of the azeotroping agent and most of it goes into the aqueous phase when the vapors are condensed. The resultant solution of dihydric alcohol and water is discarded in order to eliminate the water from the system. The loss of the dihydric alcohol is thus quite substantial, often amounting to 10 or 15 percent of the dihydric alcohol component.

In United States Patent No. 2,802,813 to Georgian et al., there is disclosed a method of forming polyesters by use of which important economies of the dihydric alcohol are effected; in some instances, there is also a moderate reduction of cooking time. In the process as claimed in the patent, the reaction is conducted under a packed column through which the mixture of vapors of the azeotroping agent, water vapors and dihydric alcohol are conducted. Water is then sprayed into the top of the column. Surprisingly, the added water acts to keep the dihydric alcohol back in the column without any appreciable tendency to reversion of the reaction. The mixture of water vapors and azeotroping solvent vapors of the column are conducted away and are subjected to condensation outside of the system. The water of condensation contains but little glycol and in toto or in part may be returned to the top of the column, while the solvent may be returned to the top of the column or otherwise returned to the reaction system. Such process satisfactorily maintains the dihydric alcohol component in the system, in many instances permitting very high economies thereof. However, while the time of cooking is in some instances substantially shortened, the total cooking time still remains objectionably long. The excessive cooking time is reflected in a high over-all cost of preparing the polyester.

In my copending application, Serial No. 68,988, filed November 14, 1960, it has been disclosed to prepare polyesters with but little loss of dihydric alcohol by a fusion cook wherein the reactants, in the complete absence of azeotroping agents, are esterified at a suitable reaction temperature while being vigorously blown with a non-reactive gas, such as carbon dioxide or nitrogen. The water is thus effectively swept from the system, but concurrently, considerable amounts of dihydric alcohol are also swept out of the system as vapor. In order to prevent excessive loss of this valuable component, the resultant mixture of gas, water vapor and dihydric alcohol is again passed through a column, the bottom of which is at a relatively elevated temperature and the top of which is below the boiling point (212° F.) of water. The partial pressure of the water in the system is thus below atmospheric pressure. This may be attained by spraying water into the top of the column. The water present in liquid phase in the top of the column at these temperatures effectively retains the dihydric alcohol. Furthermore, the rate of cooking is relatively rapid, much faster than when an azeotroping agent is used, thus permitting great economies of time in preparing the polyester product.

While such system is highly effective in the cooking of mixtures of dihydric alcohols and carboxylic components wherein the latter components are all anhydrides of the acids, or in a two-stage process where an anhydride of a dicarboxylic acid and a dicarboxylic acid, such as isophthalic acid, are separately esterified, it has been found, however, that it is not always appropriate for the preparation of polyesters by single stage fusion cook techniques from mixtures wherein the carboxylic component consists of isophthalic acid or includes isophthalic acid and added ethylenically unsaturated anhydride or acid, such as maleic anhydride, itaconic anhydride, citraconic anhydride or fumaric acid. Thus, in the preparation of polyesters from a dihydric alcohol and isophthalic acid, or a mixture of isophthalic acid and one of the foregoing ethylenically unsaturated carboxylic compounds in a single stage operation, the process as disclosed in the application aforesaid requires the use of relatively long cooking times and sometimes cannot be carried to satisfactory completion within any reasonable period.

This invention is based upon the discovery that in the single stage fusion cooking or bulk polymerization of esterifiable mixtures comprising dihydric alcohols and carboxylic compounds, wherein at least a portion of the carboxylic compounds is free isophthalic acid or a mixture thereof with an ethylenically unsaturated acid or anhydride, if the reaction is conducted at a temperature in the reaction kettle to maintain rapid heat transfer and the temperature in the top of the column constituting the refluxing zone is increased to a value above the boiling point of water, namely, within a range of 215° F. to 250° F., the rate of esterification is greatly increased, thus permitting very material economies in esterification time. Concurrently, the loss of the dihydric alcohol from the system is sharply reduced.

For a better understanding of the invention, reference may now be had to the accompanying drawings, in which the single FIGURE diagrammatically illustrates an appropriate embodiment of apparatus for the practice of the invention.

In this apparatus a suitable reaction vessel, such as a reactor 10, is provided, said reactor being provided with charging means, represented by a hatch 10a with a lid 10b, that will allow raw materials to be introduced into the vessel prior to starting the reaction run or during the run. Any means which will transfer heat energy to the reaction vessel may be employed to heat the mixture in the reactor. Examples of such means are represented by direct gas fire applied to the vessel, radiant heat, direct electrical heat, circulation of a hot heat exchange fluid, such as Arochlor, condensation of vapors, such as Dowtherm vapors, or steam and the like. For purposes of illustration, there is shown for the reactor a heating jacket 11 and a heating coil 11a through which heating media, such as one of those mentioned, may be circulated. They may be used simultaneously or separately. The jacket and coil are provided with appropriate inlets and outlets, indicated respectively at 11b, 11c, 11d and 11e, for the circulation of said medium. The reactor is also provided with an outlet 12 for discharge of ester product. Obviously, the several inlets and outlets may be provided with valves V by means of which the flow of fluid may be regulated.

In the operation of the reactor 10, heat is customarily added as rapidly as practicable, and during the main part of the reaction is expended as fast as applied in the reflux and esterification. The temperature of the reactor, therefore, rises but slowly as the reaction progresses toward completion. When the temperature in the reactor starts rapidly to climb, it signals the completion or near completion of the cycle. Usually, the temperature in the reactor is not allowed to go above about 430° F. to about 470° F. A thermometer 13 in the reactor 10 provides means for observing the temperature in the latter. During the main stages of the reaction, the temperature will maintain its own effective level regardless of the amount of heat supplied; any additional heat applied would be consumed to cause a more rapid reflux. When the temperature starts to climb rapidly, there is but little water being evolved and all or nearly all of the polyhydric alcohol has been used up.

A mechanical stirrer 14 may be used to agitate the contents of the reactor. The reactor is also provided with an inlet 15 which extends below the surface of the reaction mixture so that gas can be bubbled upwardly through the mixture whereby to remove the water of reaction as it is formed. The flow of gas upwardly through the reactants has been found to greatly improve circulation within the vessel both with and without mechanical assistance. When used in sufficient amount, it takes up the water evolved by esterification substantially as fast as it forms and thus maintains an anhydrous or nearly anhydrous reaction system. If desired, the gases may be preheated so that in addition to agitating and drying the mixture, it also aids in supplying heat to the reaction zone, though such feature is optional.

The reactor is further connected by a vapor line 16 to a refluxing column 17 of conventional design, which as diagrammatically indicated at 18, is suitably packed with bubble plates or other packing to provide at least one theoretical plate of separation.

A vapor line 19 leads from section 18a at the top of the column to a condenser 21 having appropriate cooling means, such as conduits 22, through which a cooling medium may be circulated in order to condense all but the noncondensable, gaseous components of the vapor mixture.

Condensate from the condenser passes downwardly through a line 23 to the storage container 24 in which the condensate, consisting essentially of water, is collected as at 26. Since water tends to collect in excess of that required for the future reuse as a spray in the chamber 24, a drain 27 is provided, by means of which said excess can be drained off continuously or intermittently to the sewer or to suitable storage, as may be desired. Such part of the water as may be desired for cooling purposes to the top of the column 17 is returned through a line 28. Flow may be by gravity or, as shown, may be effected by means of pump 29. Discharge to the top of the column 17 may be through spray nozzle 31, though such device is not strictly necessary, as any means to distribute the water to afford direct contact with hot vapors may be used. Water from a separate source, if of sufficient purity, may also be used; all of the condensate from the storage container 24 then being run to the sewer, with the off-gas vapors being directed to the atmosphere directly from the column top without being condensed.

A thermocouple or other suitable temperature-responsive device 32 is disposed in the column, preferably at about the mid-portion thereof, or in a zone between about one-quarter of the way from the top and one-quarter of the way from the bottom. The temperature in this zone is the criterion for the operation of the spray 31, although the zone of spray is usually, if not always, cooler than the zone about the device 32. A valve 33 is also disposed in the line 28 and may be operated to admit water through the sprinkler 31 to the top of the column in event that the temperature of the latter tends to rise above the requisite range of 215° F. to 250° F. If desired, several temperature-registering devices, as at 32a, 32b and 32c, may be provided. These need not be provided with couplings 34. These are conveniently utilized, but are not strictly necessary.

The device 32 may be a thermometer providing a reading of the column temperature, in which instance the valve 33 may be operated manually at such times as are indicated by the reading of the temperature device. However, it is usually preferred to provide a suitable connection, such as an electrical line 34, from the temperature-responsive device and being connected to a solenoid mechanism whereby the latter acts automatically to control the valve 33 when it is required to admit cooling water to the top of the column. Thermostatically controlled valves being conventional, it is not considered necessary to elaborate upon the specific structure thereof.

It will be apparent that the thermometer 32 can be so set that it will respond as the temperature goes up or down to operate valve 33 to turn on or shut off the spray 31 as required to keep the top of the column at a temperature between 215° F. and 250° F. When isophthalic acid and maleic anhydride are being esterified, the gradient of temperature between the top of the column and the zone of the thermostat is but slight, the latter zone being a little hotter, e.g., about 1 to about 10 degrees. Water, when turned on, will continue to flow until the top of the column is cooled and water descends in the column sufficiently to cool the zone about the thermostat to cause it to close the valve. This positioning of the thermostat below the top of the column gives a system of high stability. The thermostat should not be too low, else water in moving down the column to influence it, might pass on into the reactor.

Means to discharge gases from the system is indicated as comprising a vent pipe 36 from the storage container 24. This pipe may discharge to the atmosphere or may be discharged to suitable apparatus for drying the gases and returning the latter to the reactor. The vent pipe is further connected to a line 37 from the top of the reactor or the bottom of the column 17 whereby the mixture of gas and water vapor, after the polyol has been reacted with acid to form an ester, can be by-passed about the column 17. Line 37 is controlled by valve 41.

It will further be evident that where a satisfactory source of relatively pure cooling water is present, the condensate from the condenser 21 is not required. In that event, the gas-water vapor mixture can thus be allowed to escape to the atmosphere, cooling water for column 17 being drawn from such other source through line 38 having a control valve 39. In event that cooling water for spray 31 is taken from line 38 and the condensate from trap 24 is discarded, the cool, inert gas from column 17 laden with all of the water from the system in vapor form and stripped or largely stripped of polyol vapors, may be vented through line 42 controlled by valve 43. Valves 40 and 41, respectively, in lines 16 and 37 provide means for directing the gas-vapor mixture through or around the column, as may be desired.

When most of the dihydric alcohol in reactor 10 has combined and the evolution of water from the reactor slows up, the zone around thermostat 32 starts to cool and water to the top of the column is no longer required. Therefore, the valve 40 may be closed. Valve 41 may be opened and the flow of gas stepped up and vented through line 37 to the atmosphere.

In the practice of the present invention, various polyesters involving different components may be prepared.

The preferred polyols are usually glycols, many of which tend to be volatile and therefore escape rapidly from the reactor. This is especially true of glycols, the organic portions of which are hydrocarbons, i.e., without ether linkages. These glycols include ethylene glycol, 1,2-propylene glycol, 1,3-propylene glycol and butylene glycols such as 1,2-butanediol, 1,3-butanediol, 1,4-butanediol and 2,3-butanediol. The ether glycols, such as diethylene glycol, dipropylene glycol and dibutylene glycols, also tend to escape to some extent, though not so much as the foregoing glycols; portions of these, along with more volatile polyols, may be included. Other polyols which are sometimes lost to some degree comprise tripropylene glycol, triethylene glycol and glycerine. In event mixtures of polyhydric alcohols are used, e.g., propylene glycol and diethylene glycol, the ratio may be in the range of 1 to 99 percent on a molar basis of one, the rest being the other. The total of the mixed polyols will usually exceed the combination of the carbonyl components by about 3 to about 20 percent on an equivalency basis. The higher ranges of glycol may be used to impart permanent plasticity to the product and are not required to compensate for glycol loss. The present system may be applied to the preparation of any of the polyesters wherein these or other polyols, singly or in admixture, are used. The carbonyl component of the polyester usually will comprise maleic anhydride or fumaric acid, or itaconic anhydride or citraconic anhydride, mixed with free isophthalic acid, the ratio of the carbonyl compounds being substantially 1 to 5 moles of the former to 5 to 1 moles of the latter. The ratio of polyol to the sum of the carbonyl compounds is usually in a range of about 1.03 to about 1.20 moles of polyol per mole of carbonyl compound.

In the reaction, various inert or nonreactive gases may be used to sparge the reaction mixture and thus to remove water therefrom. Carbon dioxide constitutes one such gas. Likewise, nitrogen may be employed. Preferred gases comprise combustion gases such as are obtained by burning a fuel gas or a hydrocarbon gas with air to form a mixture consisting largely of carbon dioxide and nitrogen with perhaps some carbon monoxide and only minor amounts of other gaseous constituents, such as oxygen.

In conducting the reaction through the main water-producing stages, the gas may be supplied at such rate as will remove the water from the reactor and will further carry the water from the top of the column under its own partial pressure at the temperature existing in the latter region and at a rate that will keep the bottom of the column hot and free from returning water. A useful formula for determining the rate of gas flow in reactors of 300 gallons capacity or larger during the main part of the reaction is as follows:

$$C.f.m. = 1 + K\ G$$

wherein c.f.m. indicates cubic feet of gas flow per minute, and K is a number from about 0.001 to about 0.04, in most instances, it is about 0.019. G indicates the gallons of reaction mixture. Thus, for a 1000-gallon charge in the reactor, the formula indicates a flow of inert gas (c.f.m.) = $1 + 0.019 \times 1000 = 20$ c.f.m. This rate for a 1000-gallon batch may be varied substantially, for example, by about 50 percent either way, though it is considered that the rate of about 20 cubic feet of gas per minute is near the optimum for the reaction mixture normally charged to a 1000-gallon reactor. If the rate of gas flow is unduly reduced during the main reaction, it will be evident that the volume of gas will be insufficient to carry all of the water from the reactor and through the cooling zone in the top of the column. For example, if a flow rate of 0.5 cubic foot of gas per minute were substituted for the previously calculated 20 cubic feet per minute, the reaction time would be considerably longer due to poor water removal. If the gas flow is unduly increased during the main cooking stage, it will be apparent that there may be a tendency for the mixture to foam and there will be an undue over-carry of the polyol component in the vapors passing from the top of the column.

With the smaller sizes of reactors, the foregoing formula may tend to break down, owing to the relatively large value of the constant 1. However, even with reactors as small as 25 gallons, the gas flow will not be below about 0.5 cubic foot per minute. The flow seldom will exceed $1 + 0.03\ G$ (G being gallons of batch) until most of the polyol component has already at least partly reacted with the acid component.

At the conclusion of the main reaction when substantially all of the glycol is tied into the polyester and the evolution of water has slowed down, the sparge rate may be speeded up in order more completely to carry the reaction to completion and thoroughly to remove water from the polyester product. For example, the gas flow for a 1000-gallon batch may be increased to about 40 or 60 cubic feet per minute and may be carried even higher, though, of course, excessive use of sparging gas during the final stages of the reaction tends to be uneconomical because of the requirements of gas.

It will be recognized that inert gases from the reaction may be passed to the stack after they have passed through the condenser, or they may be subjected to recovery treatment, as for example, by removal of water vapor and perhaps other impurities therefrom, after which they may be reused for other purposes as desired. It will be obvious that in those instances wherein the water from the vapor mixture is not reused for cooling purposes in the system, the mixture of gases and vapors may be allowed to escape from the column without condensing out the water.

The following example is illustrative of the application of techniques of fusion cook as herein disclosed in the preparation in a single stage reaction of a polyester of a polyol and a mixture of isophthalic acid and maleic anhydride.

*Example I*

In this example, the esterifiable mixture employed comprised:

| | Moles |
|---|---|
| Propylene glycol | 11 |
| Isophthalic acid | 6 |
| Maleic anhydride | 4 |

The apparatus employed in the reaction of polyesterification was the same as that illustrated diagrammatically in the drawing. A 1000-gallon quantity comprising all components of the foregoing mixture was introduced as a fusion cook or bulk polymerization charge into the reactor 10, shown in the drawing, and was then subjected to as rapid a warm-up as could reasonably be attained. Obviously, a slower warm-up could be employed, but would be uneconomical from the standpoint of the use of the apparatus and also because excessive prolongation of the time of warm-up merely increases heat losses, heat being a relatively expensive item in the process.

Sparging through line 15 may be started at or soon after the application of heat in the reactor. At first, sparging may be, but is not necessarily, slow, e.g., 1 or 2 cubic feet of gas per minute. As water starts rapidly to come off (as can be deduced by observation of the temperature of the reactor or of column 17, or by observing the accumulation of water in container 24), the sparge rate is stepped up, for example, to about 15 to about 25 cubic feet of gas per 1000 gallons of batch. Twenty (20) cubic feet constitutes a good average and is sufficient to take up all water and carry it as vapor through the column 17. But little or no water is absorbed in the condensed polyol returning through the column.

As already explained, the reflux of the propylene glycol places an effective limit on the temperature in the reactor 10. So long as evolution of water is occurring at a reasonably rapid rate and so long as heat is being used up in the esterification reaction and refluxing of polyol, the temperature will automatically remain at a satisfactory level. Normally, evolution of water can be expected to begin at a substantial rate at about 380° F. As the reaction progresses, it can be expected that the temperature will tend to rise because of slowing up of the evolution of water and of the esterification reaction and a reduction of the quantity of unreacted polyol present to reflux. Heating is continued with increase of temperature until a maximum temperature of about 420° F. to 470° F. in the reactor 10 is attained. This takes place when most of the propylene glycol is reacted and but little water is being given off.

During the course of the reaction time wherein water is vigorously evolved and polyol is evaporated, both being taken up by the sparging gas, the temperature of the top of column 17 tends to rise and would attain a high value if measures were not taken to limit it. Thus, water may be added through spray 28 to limit the upper temperature to about 240° F. The mid-column temperature, which is of nearly the same temperature but usually slightly above that in the top, is monitored to de-determine when and/or how much water should be added to maintain the temperature in the top of the column.

When the apparatus is small, the atmospheric cooling of the top of the column may be sufficient to maintain the temperature range of 215° F. to 250° F. in the top of the column without added water. This is not true in event of the larger sizes of apparatus.

When a 1000-gallon batch of propylene glycol, maleic anhydride and isophthalic acid is used, a flow of water in a range of about ¼ to 3 gallons per minute is effective. This flow is not necessarily continuous, but may be temporarily shut off when the temperature in the monitored zone tends to drop too low.

The temperature in the mid-portion of the column has been found to be relatively more stable than the top temperature, and usually is more convenient to observe. In the system under consideration wherein free isophthalic acid is esterified with a polyol, such as propylene glycol, the temperatures of the mid-portion of the column and the top are found closely to coincide, the difference being within a range of about 1° F. to 10° F.

As the esterification progresses and the dihydric alcohol is used up, the temperature in the zone in reactor 10 begins to rise relatively rapidly and the rise is not accompanied by a corresponding rise in the temperature in the mid-portion of the column. This phenomenon is understandable inasmuch as the temperature in the column is maintained primarily by the temperature of the vapors of water and polyol reaching this zone. When the reaction is slowed up by reason of approach of completion, it is obvious that the temperature in the column will tend to fall. The further continuation of the application of a water spray at this stage is not required and may be discontinued. The sparging with inert gas, however, is continued and the rate thereof may be stepped up, if desired, for example, to about 40 to 60 cubic feet per minute, in order to attain more thorough stripping off of water. The application of heat in reactor 10 is continued along with sparging until desired acid number and viscosity are attained, for example, a viscosity of T–V in a test solution of a concentration of 60 percent solids in the monoethyl ether of ethylene glycol. At this stage, using the foregoing reaction mixture, the acid value is in a range of 17 to 34. These values obviously will vary for different polyesters and with the tailoring of the polyester to meet specific specifications. The maximum temperature in the reactor is about 450° F.

The time of cooking need not be relied upon as the criterion of the completion of the reaction, the other incidents, such as the dropping of the temperature in the column even though the temperature of the reaction vessel is increasing, is one criterion; the attainment of desired viscosity and the failure of the acid value further to drop with prolongation of the cook constitute others. However, it will be recognized that the time required for the cook is phenomenally short considering that the mixture comprising the free isophthalic acid is very difficult to esterify. It will also be recognized that compared with conventional methods of cooking, the loss of glycol following the procedure above outlined is relatively low.

For purposes of comparison, the foregoing mixture has been subjected to esterification by the procedures outlined in the foregoing patent to Georgian et al. using the solvent method of cooking. In the process, about 17 molar percent of excess glycol based upon the acid and anhydride content of the reactants was introduced into the reactor. The mixture was heated as rapidly as possible to evolve water. The water and propylene glycol and solvent vapors were passed through a column which corresponded to that described and a solvent-water mixture was sprayed into the top of the column to maintain the temperature therein in a range between 195° F. and 205° F. The times required and the glycol losses for the two methods are compared as follows:

| | Non-Solvent (Fusion Cook) Method | Solvent Method |
| --- | --- | --- |
| Time | 10 hours, 30 minutes | 25 hours. |
| Excess propylene glycol used | 10 percent | 17–20 percent. |

*Example II*

In this example, the esterifiable mixture comprised a mixture of propylene glycol and diethylene glycol as polyol components. The ratios of the several components of the reaction mixture are as follows:

| | Moles |
| --- | --- |
| Propylene glycol | 8.1 |
| Diethylene glycol | 2.6 |
| Isophthalic acid | 4.0 |
| Maleic anhydride | 6.0 |

The apparatus employed is the same as has been described. All of the foregoing ingredients are charged into the reactor 10, inert gas is then sparged into the mixture through conduit 15 at a rate of 8 cubic feet per minute based upon 1000 gallons of charge, and full heat is turned on in the reactor. When the kettle reaches 400° F., the sparging rate is increased to 20 cubic feet per minute per 1000 gallons of charge. The middle controls of column 17 are set for a temperature of 235° F. and water is introduced into the top of the column at such rate as to maintain the temperature in a range of 235° F. to 240° F. The esterification reaction is maintained as the temperature of the kettle gradually rises to about 450° F., which is attained in about 5½ hours, at which time the acid number is about 78 and the viscosity is G+. The log of the further reaction is maintained as follows:

| Time | Acid Value | Viscosity |
| --- | --- | --- |
| 6½ hours | 57 | J+ |
| 7½ hours | 40 | K |
| 8½ hours | 34 | T+ |

At the latter stage, the column is switched to blowing, that is, the column 17 is eliminated from the system by closure of the valve 40 and opening of the valve 41, and the reaction mixture is blown with inert gas for 30 minutes and is then thinned with a monomer, namely, styrene, to obtain a desired viscosity. Usually, the styrene addition will comprise about 45 to about 50 percent of the final mixture and the viscosity will be in the range of 300 to 400 centipoises at 77° F. A typical batch will have a drop viscosity of V at 60 percent in monoethyl ether of ethylene glycol and an acid number of 30.

If desired, inhibitors of gelation, e.g., hydroquinone, tertiary butyl catechol and 3-isopropyl catechol, may be added to the final mixture or may be cooked into the polyester component. The amount thereof may be in a range of about 0.001 to about 0.1 percent by weight based upon the polyester. The invention also includes the addition of quaternary ammonium salts, such as trimethylbenzyl ammonium chloride, to the mixture. These constitute effective gelation inhibitors during storage of the polyester-monomer mixtures. They also constitute accelerators of cure when peroxidic catalysts of curing are added.

The resultant polyester-monomer mixture can be catalyzed with various catalysts, such as benzoyl peroxide, cumene hydroperoxide and others, cast and finally cured to provide hard, resinous bodies in well-known manner.

The forms of the invention as herein described are to be considered as being by way of example. It will be apparent to those skilled in the art that numerous modifications may be made therein without departure from the spirit of the invention or the scope of the appended claims.

This application is a continuation-in-part of my copending application, Serial No. 68,988, filed November 14, 1960.

I claim:
1. The method of forming a polymeric polyester which comprises cooking together at a temperature of about 390° F. to about 470° F. a substantially solvent-free mixture consisting essentially of:
 (A) a glycol selected from the class consisting of ethylene glycol, diethylene glycol, a propylene glycol and a butylene glycol, and
 (B) a mixture of an ethylenically unsaturated dicarboxylic acid and free isophthalic acid, while bubbling a free nonreactive gas through the mixture at a rate represented by the formula: $c.f.m. = 1 + K\,G$, wherein c.f.m. equals cubic feet per minute, $K$ is a number in a range of about 0.001 to about 0.04, and $G$ equals gallons of reaction mixture, passing the mixture of gas and vapors dispersed therein upwardly through a zone of refluxing equivalent at least to one theoretical plate of separation wherein there is at least a 1° F. difference in temperature between the mid-point of said zone and the top of said zone, while spraying into the top of the zone water in an amount to reduce the temperature in the top of said zone to a value in a range between 215° F. and 250° F. whereby to condense out polyol while leaving water vapor uncondensed in the gas, returning the polyol to the mixture while withdrawing the mixture of gas and water vapors from the zone of refluxing.

2. The method of forming a polymeric polyester which comprises cooking together at a temperature of about 390° F. to about 470° F. a substantially solvent-free mixture consisting essentially of:
 (A) a glycol selected from the class consisting of ethylene glycol, diethylene glycol, a propylene glycol and a butylene glycol, and
 (B) a mixture of (1) a material selected from the group consisting of maleic anhydride and fumaric acid, and (2) free isophthalic acid, while bubbling a free nonreactive gas through the mixture at a rate represented by the formula: $c.f.m. = 1 + K\,G$, wherein c.f.m. equals cubic feet per minute, $K$ is a number in a range of about 0.001 to about 0.04, and $G$ equals gallons of reaction mixture, passing the mixture of gas and vapors dispersed therein upwardly through a zone of refluxing equivalent at least to one theoretical plate of separation wherein there is at least a 1° F. difference in temperature between the mid-point of said zone and the top of said zone, while spraying into the top of the zone water in an amount to reduce the temperature in the top of said zone to a value in a range between 215° F. and 250° F. whereby to condense out polyol while leaving water vapor uncondensed in the gas, returning the polyol to the mixture while withdrawing the mixture of gas and water vapors from the zone of refluxing, and condensing out the water vapors from the free gas and returning the water thus recovered at least in part as said spray to the top of the reflux zone.

3. The method of forming a polymeric polyester which comprises cooking together at a temperature of about 390° F. to about 470° F. a substantially solvent-free mixture consisting essentially of:
 (A) a glycol selected from the class consisting of ethylene glycol, diethylene glycol, a propylene glycol and a butylene glycol, and
 (B) a mixture of (1) a material selected from the group consisting of maleic anhydride and fumaric acid, and (2) free isophthalic acid, while bubbling a free nonreactive gas through the mixture at a rate represented by the formula: $c.f.m. = 1 + K\,G$, wherein c.f.m. equals cubic feet per minute, $K$ is a number in a range of about 0.001 to about 0.04, and $G$ equals gallons of reaction mixture, passing the mixture of gas and vapors dispersed therein upwardly through a zone of refluxing equivalent at least to one theoretical plate of separation wherein there is at least a 1° F. difference in temperature between the mid-point of said zone and the top of said zone, while spraying into the top of the zone water in an amount to reduce the temperature in the top of said zone to a value in a range between 220° F. and 240° F. whereby to condense out polyol while leaving water vapor uncondensed in the gas, returning the polyol to the mixture while withdrawing the mixture of gas and water vapors from the zone of refluxing.

4. The method of forming a polymeric polyester which comprises cooking together at a temperature of about 390° F. to about 470° F. a substantially solvent-free mixture consisting of:
 (A) a glycol selected from the class consisting of ethylene glycol, diethylene glycol, a propylene glycol and a butylene glycol, and
 (B) a mixture of maleic anhydride and free isophthalic acid, while bubbling a free nonreactive gas through the mixture at a rate represented by the formula: $c.f.m. = 1 + K\,G$, wherein c.f.m. equals cubic feet per minute, $K$ is a number in a range of about 0.001 to about 0.04, and $G$ equals gallons of reaction mixture, passing the mixture of gas and vapors dispersed therein upwardly through a zone of refluxing equivalent at least to one theoretical plate of separation wherein there is at least a 1° F. difference in temperature between the mid-point of said zone and the top of said zone, while spraying into the top of the zone water in an amount to reduce the temperature in the top of said zone to a value in a range between 220° F. and 240° F. whereby to condense out polyol while leaving water vapor uncondensed in the gas, returning the polyol to the mixture while withdrawing the mixture of gas and water vapors from the zone of refluxing, condensing the water vapor from the gas and returning the water at least in part as said spray to the top of the refluxing zone.

References Cited in the file of this patent

UNITED STATES PATENTS

| | | |
|---|---|---|
| 2,595,625 | Agnew | May 6, 1952 |
| 2,892,812 | Helbing | June 30, 1959 |
| 2,892,813 | Georgian | June 30, 1959 |
| 2,973,341 | Hippe | Feb. 28, 1961 |